United States Patent [19]

Reiter

[11] Patent Number: 4,684,920

[45] Date of Patent: Aug. 4, 1987

[54] REMOTELY CONTROLLED BYPASS FOR AUTOMATIC WATERING SYSTEM

[75] Inventor: Stuart L. Reiter, River Vale, N.J.

[73] Assignee: United Water Resources, Inc., Harrington Park, N.J.

[21] Appl. No.: 824,268

[22] Filed: Jan. 30, 1986

[51] Int. Cl.⁴ .................... H04M 11/04; A01G 25/00; B05B 12/08

[52] U.S. Cl. ............................ 340/310 A; 340/310 R; 340/696; 239/63; 239/64; 239/67; 239/69; 239/70; 239/DIG. 15; 137/78.3

[58] Field of Search ............... 340/310 A, 310 R, 696, 340/825.06, 825.12, 825.13, 825.29; 239/69–71, 63, 64, DIG. 15; 137/78.2, 78.3, 80, 624.11

[56] References Cited

U.S. PATENT DOCUMENTS

| | | | |
|---|---|---|---|
| 3,653,595 | 4/1972 | Greengard, Jr. et al. | 239/70 |
| 3,726,477 | 4/1973 | Shapiro | 239/70 |
| 4,007,458 | 2/1977 | Hollabaugh | 340/310 A |
| 4,176,395 | 11/1979 | Evelyn-Veere et al. | 239/69 |
| 4,209,131 | 6/1980 | Barash et al. | 239/69 |
| 4,545,396 | 10/1985 | Miller et al. | 239/69 |
| 4,569,020 | 2/1986 | Snoddy et al. | 239/69 |

Primary Examiner—Donnie L. Crosland
Attorney, Agent, or Firm—Lalos & Keegan

[57] ABSTRACT

An automatic irrigation system in which a plurality of zones of a ground area are periodically watered for a predetermined time in a predetermined sequence. Located within each zone is a ground moisture sensor that overrides the automatic irrigation system and prevents watering if the sensed ground moisture is at or above a chosen value. Apparatus is provided which, from a central location, can bypass the automatic irrigation system and the ground sensors. A central transmitter coupled to a plurality of remote receivers enables simultaneous or sequential watering of all zones by actuating the remotely located valves regardless of the sensed ground moisture level.

13 Claims, 2 Drawing Figures

FIG. I.

REMOTELY CONTROLLED BYPASS FOR AUTOMATIC WATERING SYSTEM

BACKGROUND OF THE INVENTION

This invention relates generally to irrigation and sprinkling systems, and more particularly to control systems in which periodic, automatic watering is enabled or disabled by ground moisture sensors.

Automatic irrigation or sprinkling systems are often utilized in commercial environments such as golf courses or public parks to alleviate manual watering and to control the time and amount of watering for a particular area. These automatic watering systems generally comprise an irrigation clock which initiates sprinkling at predetermined times for predetermined intervals.

A disadvantage of systems utilizing preset clocks or timers is that the watering system is automatically turned on regardless of soil moisture or weather conditions. As a result, excess watering can occur during periods of abnormal rainfall or rain occurring during the watering cycle.

Rather than relying on manual intervention to override the automatic timers, ground moisture sensors have been employed to inhibit watering when the level of moisture is at or above a chosen value. As a result, automatic watering can be accomplished without the inherent problem of overwatering.

The override feature provided by the ground moisture sensors, however, presents another problem. At certain times, for example during periods of unusual heat or drying conditions, watering may be necessary even though the ground sensors provide an opposite indication. On golf courses, for example, the grass is cut very close to the ground on the fairway and especially on the putting green. On a very hot day, the superficial layer of the soil will dry more rapidly than the underlying soil. The sensor, generally positioned to measure the moisture in the underlying soil, may inhibit the sprinkling system even though watering may be required to prevent certain areas from drying out or burning. It would be desirable, under these conditions, to permit watering for just a short period to moisten the superficial ground level and prevent damage to the green or fairway. However, this would require that the ground moisture sensor be manually disabled to allow the sprinklers to be turned on.

The present invention overcomes this disadvantage by providing a system which can bypass the ground moisture sensor and enable watering when watering or irrigation would normally be disabled by the sensor. The present invention includes a central irrigation clock programmed to enable watering of several zones of an area under irrigation control. To reduce the burden on the water supply and to maintain adequate pressure, the zones can be watered sequentially with each zone being watered for a given time period.

Located in proximity to the clock at a central office is a remote control transmitter. The remote control transmitter, in response to the activation of a bypass switch or closure of a bypass contact, will transmit a direct current bypass signal to remote receivers which effectively latch or hold that signal. The remote control transmitter will then transmit alternating current to the remote receiver to permit watering regardless of the state of the central clock.

Located within each zone is a valve installed in an irrigation line to control water flow to a sprinkler head. Located in proximity to the valve is a remote receiver connected to a ground moisture sensor that is in turn connected to the valve. Power is delivered through the receiver and the sensor to the valve during normal operation. The remote receiver is also directly connected to the valve to deliver power and open the valve during a bypass mode of operation. Each remote receiver is connected to the centrally located remote transmitter by a two-wire power line which delivers both ac power and the dc bypass signal.

The present invention provides a simple, easy to install, and inexpensive to manufacture system in which remotely located ground sensors can be effectively bypassed from a central office. The advantages of the present invention are realized with a minimum of amount of circuitry and minimum wiring between a central office and remotely located valves.

DETAILED DESCRIPTION

Figure 1:
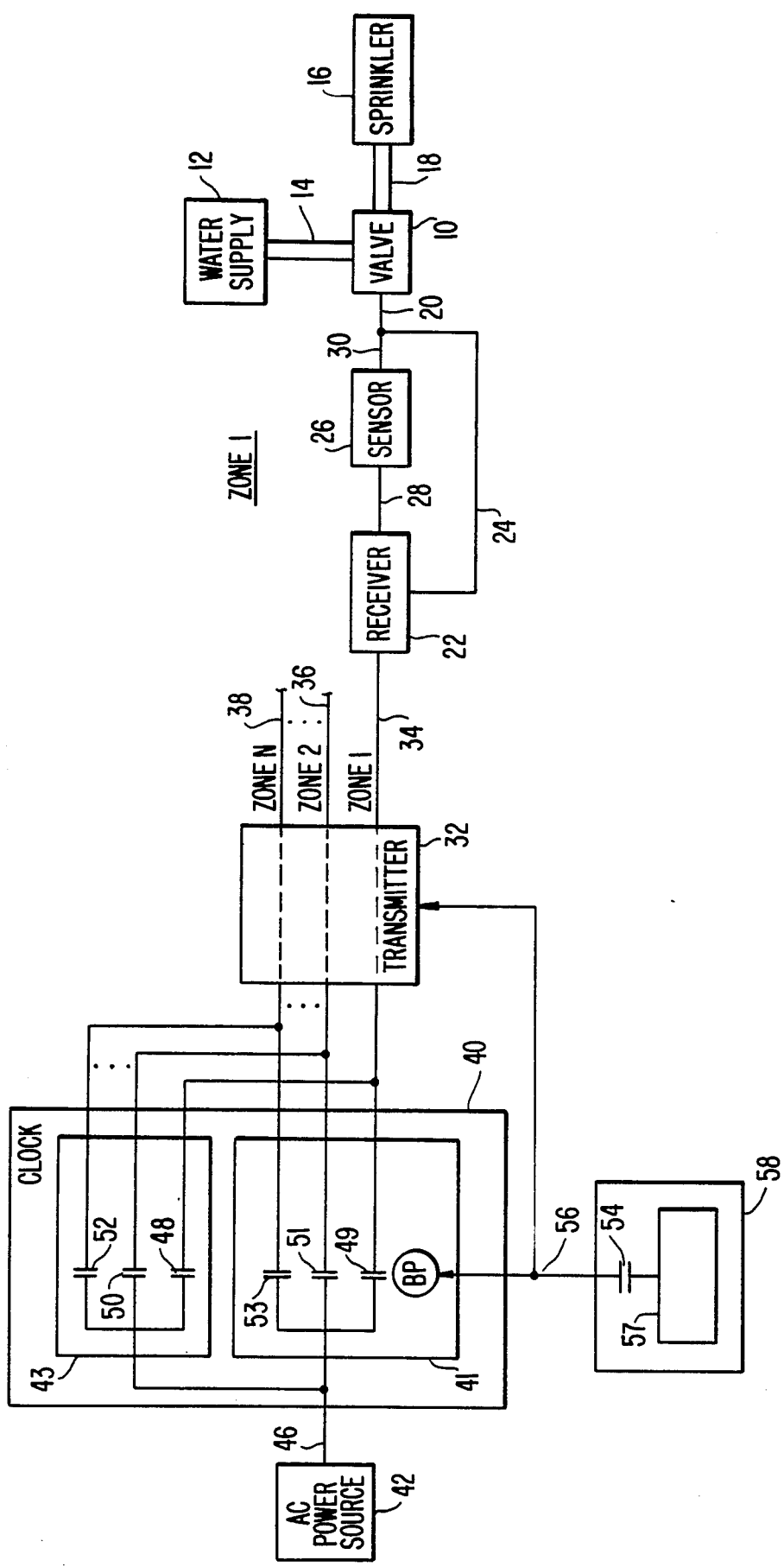
FIG. 1 is a general block diagram of the present invention illustrating one zone of a multiple zone automatic irrigation system.

FIG. 1 is a general block diagram of the automatic watering system of the present invention. Although the entire system would include multiple zones of an area under irrigation control, the apparatus associated with only one zone is being shown for the purpose of discussing the present invention. Within each zone is a normally closed, electrically operable fluid valve 10. Valve 10 may be any type of valve which opens in response to an electrical signal. Examples of this type are solenoid actuated valves and valves which open in response to the heating of an element within the valve housing. Each valve 10 within a zone is connected to a water supply 12 through a pipe, tube, or other type of water supply conduit 14. Valve 10 controls the supply of water to a sprinkler head 16, or similar watering device, through conduit 18. Sprinkler head 16 may be one of several installed on a golf course green, for example.

Connected to valve 10 is a two-wire power line 20 which supplies the alternating current required to open valve 10. Power to valve 10 is received directly from remote receiver 22 through bypass power line 24 or through ground sensor 26 via power lines 28 and 30. Ground sensor 26 may be any commercially available diffusion or soil moisture sensor which closes a relay in response to sensing relatively low ground moisture and opens a relay in response to sensing relatively high moisture. Sensors of this general type are shown in U.S. Pat. Nos. 2,768,028 and 3,297,254.

Remote receiver 22, shown generally in FIG. 1, is connected to the centrally located transmitter 32 via two-wire power line 34 which carries both ac power and a dc bypass signal as will be further described with reference to FIG. 2. For each zone of the area under irrigation control, there will be installed a remote receiver 22, sensor 26, valve 10, and sprinkler 16 as shown in FIG. 1. Each remote receiver located in zone 1, zone 2, etc. up to zone N will be connected to a single, centrally located transmitter 32 via a two-wire power line shown as lines 34, 36 and 38 in FIG. 1.

Central transmitter 32 is connected to an ac power source 42 through central clock or timing device 40. In the preferred embodiment, power source 42 typically supplies 24 Vac to clock 40 via two-wire power line 46. The central clock or timing device 40 may be any commercially available programmable irrigation clock. Clocks of this type are shown in U.S. Pat. No. 3,140,720. Clock 40, shown generally in FIG. 1, is programmed to permit water flow through valves in preselected zones for preselected time periods. The clock 40, for example, could be programmed to permit watering in zone 1 for a half-hour beginning at midnight, then in zone 2 for a half-hour, and so on. This automatic programmed sequence enables watering to take place when water demands are relatively low and when personnel are generally unavailable. The clock operation can be simply viewed as opening and closing a number of switches (e.g. 48, 50, 52) in series with the power line from the ac source and the power lines to the valves and related apparatus. As each series switch is closed, power is supplied to the associated zone apparatus to activate the valve and enable watering. Switch group 43 is provided for normal water sequencing and switch group 41 is provided for water sequencing in a bypass mode of operation as will be explained hereinafter.

Central transmitter 32, shown generally in FIG. 1, is responsive to the opening or closing of a single bypass switch 54 in series with an electrical source 57. As a result of this configuration, closing switch 54 from location 58 in, for example, a central office, enables power to become available to all zones in a bypass mode of operation. Closing switch 54 generates a bypass signal that is received on line 56 in central transmitter 32 and central clock 40. This signal may be generated in any suitable manner such as closing a switch or set of contacts, or application of a voltage. The transmitter 32, located at some central location with the clock 40, can be activated to allow temporary watering of all the zones. The transmitter could be activated, for example, to permit all zones to be watered for two minutes in the middle of a very hot day to prevent the superficial ground layer from drying out and causing the green or fairway to be damaged. In order to bypass sensor 26, however, receiver 22 must be able to differentiate between power received in response to activation of clock 40 in a normal sequencing mode and activation of clock 40 as a result of a signal received from bypass switch 54. Otherwise, ground sensor 26 will prevent power from reaching valve 10 if moisture in the lower ground level is at or above a predetermined value. The ground sensor may prevent watering even if the upper ground surface is drying out.

In one embodiment of central clock 40, contacts 49, 51, and 53, etc. in switch group 41 are configured to allow sequential watering of the zones in response to the bypass signal. These contacts can be wired to allow zone 1 to be watered for two minutes, then zone 2, etc. Sequencing can be implemented using a stepping relay BP energized in response to the signal received on line 56. This would permit people playing on a golf course, for example, to observe the watering sequence and move accordingly. In an alternative embodiment, bypass relay BP is configured such that contacts 49, 51, 53, etc. will all be closed in response to the bypas signal and all zones would be watered simultaneously (e.g. for two minutes).

Figure 2:
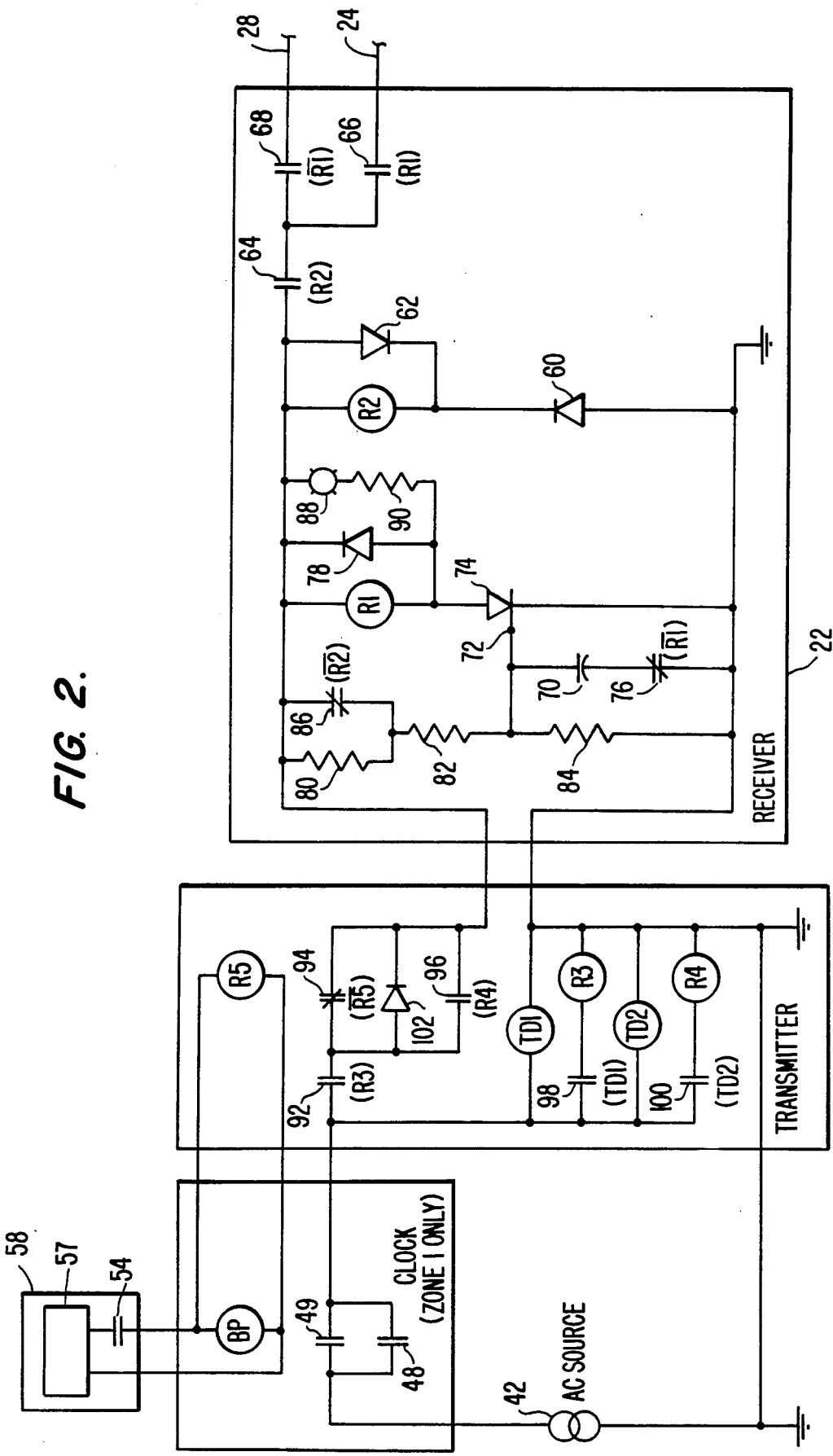
FIG. 2 is a detailed circuit diagram of the centrally located transmitter and remotely located receiver of the present invention.

FIG. 2 shows the circuit of transmitter 32 and receiver 22 of the present invention. This circuitry permits ground sensor 26 to be bypassed during periods of short term watering when the bypass switch 54 is activated in the central office. The circuitry of the present invention enables sensor 26 to be bypassed without running a second two-wire power line from central transmitter 32 to each zone. The circuitry of transmitter 32 and receiver 22 are configured such that ac power received in response to closure of bypass switch 54 can be transmitted to valve 10 without going through sensor 26. Power received in response to closure of switch contacts in normal sequencing switch group 43, however, will be transmitted through sensor 26. As a result, the function of the ground moisture sensor can be retained in the system as an override during programmed operation without inhibiting watering under special conditions.

Receiver 22 includes two relays or switching devices R1 and R2 as shown in FIG. 2. These relays or switching devices are configured such that ac power received in response to closure of a normal sequencing clock switch will close only relay R2 resulting in connection of ac power to power line 28 and sensor 26. The circuit configuration of receiver 22 also enables relay R1 to close in response to reception of a dc signal from the transmitter, as will be explained hereinafter. When the dc signal is followed by transmission of ac power in response to the bypass switch being closed, both relays R1 and R2 will close resulting in connection of ac power to power line 24 and valve 10. The functional representation of relays R1 and R2 that connect ac power to lines 28 and 24 is shown by relay contacts 64, 66, and 68. Contacts 64 of relay R2 and contacts 66 of relay R1 are represented as normally open, but will close when the relays are energized by a current input. Contacts 68 are represented as the functional inverse of contacts 66, normally closed, but opened in response to current input.

As represented in FIG. 2, a current path to either power line 24 or 28 requires contacts 64 of relay R2 to be closed, i.e. when current is applied to energize relay R2. The state of relay R1 then determines whether power line 24 or 28 will be electrically connected through receiver 22. When current is applied to energize relay R1, contacts 66 will close connecting ac power to line 24. The inverse is true if current is not applied to energize relay R1—line 28 will be electrically connected to transfer power through sensor 26 to valve 10, as shown in FIG. 2 by the representation of the contacts 68 of R1.

Referring to FIG. 2, receiver 22 functions in response to signals received from transmitter 32 according to the operation of relays R1 and R2. Under normal operating conditions, clock 40 transmits ac power to a selected zone for a given time period. If zone 1 is selected, ac power is sent to receiver 22 through line 34. As shown in FIG. 2, relay R2 is connected in series with diode 60 and in parallel with diode 62 such that relay R2 will be energized in response to the alternating current transmitted to receiver 22. Relay R1, however, will not be energized because of the connection of capacitor 70 to gate 72 of silicon controlled rectifier (SCR) 74. In the preferred embodiment, the value of capacitor 70 is 1000 microfarads. Capacitor 70 effectively passes alternating current but blocks or stops direct current. Since capacitor 70 is connected to gate 72 of SCR 74, SCR 74 is prevented from switching on until a direct current signal is received. As a result, forward current through the SCR is prevented and relay R1 will not be energized by alternating current received from transmitter 32. As previously discussed, when relay R2 is energized and relay R1 is not energized, contacts 64 of R2 and contacts 68 of R1 will be closed thereby electrically connecting the receiver to power line 28. This has the effect of transmitting ac power from transmitter 32 to valve 10 through sensor 26. If ground sensor 26 detects sufficient moisture in the ground it will override clock 40 and prevent the alternating current from being transmitted to valve 10 via power lines 30 and 20.

In a bypass mode of operation, i.e. when it is desired to water all zones regardless of the normal sequencing operation of clock 40 or the ground sensors, bypass switch 54 is activated from central location 58. As will be further described in relation to transmitter 32, this action results in the transmission of a one second, pulsating, positive dc signal followed by alternating current. The effect of the positive dc signal is to energize relay R1 but not relay R2. Relay R2 will not be energized because of the presence of diode 60 which requires negative current to conduct. Since R2 does not energize and contacts 64 remain open, the dc signal is not passed to lines 24 or 28.

Relay R1 will be energized by the dc signal due to the effect of capacitor 70 which blocks the dc signal and maintains sufficient voltage to provide a gate current to SCR 74 which switches SCR 74 on. Once relay R1 is energized, contacts 76 of relay R1 open and effectively remove capacitor 70 from the circuit. With capacitor 70 removed from the circuit, relay R1 will be energized by alternating current due to the configuration of diode 78 and SCR 74. Alternating current is sent by transmitter 32 immediately after transmission of the dc signal. Relay R2 will similarly be energized by the alternating current as previously described. With both relays energized, the ac will be connected to power line 24 since contacts 64 of relay R2 and contacts 66 of relay R1 will be closed. The ac power received during a bypass mode of operation is thereby routed around sensor 26 and directly to valve 10.

Resistors 80, 82, and 84 have values of 1K, 330, and 1K ohms respectively, in the preferred embodiment. These values can, of course, be varied as can the 24 Vac supply voltage (ac source 42). Resistor 80 is placed in the circuit when normally closed contacts 86 of relay R2 are opened. Lamp 88 in series with resistor 90 (typically 1K ohms) is used as a polarity check when the two-wire line 34 is installed at receiver 22. Lamp 88 will light in response to a dc signal received on cable 34 when properly connected.

Referring again to FIG. 2, the function of transmitter 32 will be described in terms of the operation of relays or switching devices R3, R4 and R5, and time-delayed switches TD1 and TD2. Bypass switch 54 is closed from central location 58 in bypass mode. Closing bypass switch 54 has the effect of energizing bypass relay BP and relay R5. If relay BP is configured as a stepping relay, contacts 49 (zone 1) will be closed for a preselected period, then contacts 51 (zone 2), and so on. Otherwise, energizing relay BP will result in all sets of contacts in switch group 41 being closed simultaneously. Switch contacts 48, associated with zone 1, are part of normal sequencing switch group 43 and are unaffected by relay BP. As mentioned above, closing bypss switch 54 results in relay R5 being energized which has the effect of opening contacts 94 of relay R5. Thus, in a bypass operation, switch 54 is closed resulting in relay contacts 49 being closed and relay contacts 94 being opened. Approximately ¼ second after bypass switch 54 is closed, time delay switch TD1 is activated and switch contacts 98 are closed. This results in relay R3 being energized and contacts 92 of relay R3 are closed. With contacts 94 of relay R5 opened, ac power is transmitted through diode 102. Diode 102 will act to clip the negative half of the alternating current from source 42 resulting in a pulsating dc signal being transmitted to receiver 22. After a one second delay, time delay switch TD2 will be activated and switch contacts 100 will close. This results in relay R4 being energized and contacts 96 of relay R4 are closed. Diode 102 will then be effectively short-circuited and the complete alternating current signal will be transmitted to receiver 22. As described above, the effect of the one second, pulsating dc signal followed by alternating current is to energize both relays R1 and R2 of receiver 22. In the normal watering sequence operation, contacts 48 of switch group 43 would be closed to water zone 1. Since relay R5 is not energized in the normal mode of operation, contacts 94 of relay R5 are always closed and diode 102 is always short circuited. Therefore, only the complete ac signal is transmitted during the normal mode.

From the foregoing description, it will be apparent that the present invention provides an effective, yet inexpensive and easy to manufacture device for controlling an automatic irrigation system. The transmitter and receiver of the present invention, interposed between the irrigation clock and moisture sensor, utilizes the same two-wire power cable that would normally connect the clock and sensor. The combination of the centrally located transmitter and the remotely located receiver provides a novel apparatus for bypassing the moisture sensor without the need for physically disabling the sensor at the remote location or running a separate two-wire cable from a central office to the remotely located valves.

The present invention is not limited to the specific features detailed in the preferred embodiment described above. Various changes and modifications can be made without departing from the scope of the invention as defined in the claims.

I claim:

1. In an automatic irrigation system including a device for controlling periodic watering of a ground area by selectively delivering power to actuate a fluid valve, and a ground sensor electrically connected to override said periodic watering device, apparatus for bypassing said ground sensor comprising:

a transmitter for receiving alternating current through said periodic device and for delivering power to a remote receiver;

said remote receiver including a first connection means for electrically connecting said receiver to said fluid valve through said ground sensor and a second connection means for electrically connecting said receiver directly to said fluid valve;

bypass means coupled to said transmitter for sensing a bypass signal to said transmitter;

said transmitter including converting means for converting alternating current received through said periodic device to pulsating direct current;

said converting means responsive to said bypass signal for converting said alternating current to direct current for a fixed time period; and, said receiver including enabling means responsive to said direct current for enabling said second connection means to electrically connect said receiver directly to said fluid valve.

2. Apparatus according to claim 1 in which said transmitter is coupled to said receiver by a two-wire power line which carries both alternating current and a pulsating direct current signal formed by conversion of said alternating current in said transmitter.

3. Apparatus according to claim 1 in which said transmitter includes first and second transmitter switching devices energized in response to said bypass signal, and said transmitter further includes means for delaying for a preselected time period the energization of said second transmitter switching device after said first transmitter switching device is energized.

4. Apparatus according to claim 3 in which said converting means is responsive to said first transmitter switching device being energized for converting alternating current to pulsating direct current and said converting means being disabled in response to said second transmitter switching device being energized.

5. Apparatus according to claim 1 in which said receiver includes first and second receiver switching devices responsive to alternating current received from said transmitter for electrically connecting said receiver to said ground sensor and for electrically connecting said receiver to said fluid valve when said transmitter supplies said pulsating direct current followed by said alternating current.

6. Apparatus according to claim 5 in which both said first and second receiver switching devices are energized to electrically connect said receiver to said fluid valve, and only said second switching device is energized to electrically connect said receiver to said ground sensor.

7. Apparatus according to claim 6 in which said second receiver switching device is energized in response to alternating current received from said transmitter, and said first receiver switching device remains energized in response to alternating current following said pulsating direct current received from said transmitter.

8. In an automatic irrigation system for controlling the periodic watering of a plurality of zones of a ground area including a central timing device for selectively providing power to actuate a fluid valve in each zone in a predetermined sequence and for a predetermined duration and in which each valve is coupled to a ground sensor that prevents power from being provided to each associated valve if the moisture content of the ground in the associated zone is at or above a predetermined value, apparatus for providing power to all zones in said ground area independently of said predetermined sequence and for bypassing said ground sensor associated with each valve and providing power directly to each valve in each zone comprising:

a plurality of remote receivers, each being located in one of said zones in proximity to a valve in each zone;

each said remote receiver including a first connection means for electrically connecting said receiver to said fluid valve through said ground sensor and a second connection means for electrically connecting said receiver directly to said fluid valve;

a central transmitter coupled to each of said remote receivers and to said central timing device for receiving alternating current through said central timing device and for delivering power to a remote receiver;

bypass means coupled to said central transmitter for sending a bypass signal to said central transmitter;

said central transmitter including converting means for converting alternating current received through said central timing device to pulsating direct current;

said converting means responsive to said bypass signal for converting said alternating current to direct current for a fixed time period;

said receiver including enabling means responsive to said direct current for enabling said second connection means to electrically connect said receiver directly to said fluid valve.

9. Apparatus according to claim 8 in which said central transmitter is coupled to each of said remote receivers by a two-wire power line which carries both alternating current and pulsating direct current formed by conversion of said alternating current in said central transmitter.

10. Apparatus according to claim 8 in which said central transmitter includes first and second transmitter switching devices responsive to said bypass signal for controlling said converting means to convert alternating current to pulsating direct current.

11. Apparatus according to claim 10 in which said first and second transmitter switching devices are energized in response to said bypass signal and said central transmitter includes means for delaying for a preselected time period the energization of said second transmitter switching device after said transmitter switching device is energized.

12. Apparatus according to claim 11 in which said converting means is enabled by activation of said first transmitter switching device and is disabled by activation of said second transmitter switching device.

13. Apparatus according to claim 8 in which each of said remote receivers includes first and second receiver switching devices, said second receiver switching device energized in response to alternating current received from said central transmitter for electrically connecting said receiver to said ground sensor, and said first receiver switching device energized in response to pulsating direct current received from said central transmitter and remaining energized by alternating current following said pulsating direct current and cooperating with said second receiver switching device energized in response to said alternating current following said pulsating direct current for electrically connecting said receiver to said valve.

* * * * *

UNITED STATES PATENT AND TRADEMARK OFFICE
CERTIFICATE OF CORRECTION

PATENT NO. : 4,684,920
DATED : August 4, 1987
INVENTOR(S) : Stuart L. Reiter

It is certified that error appears in the above-identified patent and that said Letters Patent is hereby corrected as shown below:

In Claim 1, line 15, "sensing" should read -- sending --.

Signed and Sealed this

Eighth Day of December, 1987

Attest:

DONALD J. QUIGG

*Attesting Officer*          *Commissioner of Patents and Trademarks*